Nov. 2, 1971   G. E. SHUCHARD III   3,616,537
VISUAL AID DEVICE
Filed Feb. 11, 1970   3 Sheets-Sheet 1

INVENTOR.
GEORGE E. SCHUCHARD
BY
ATTORNEY

INVENTOR.
GEORGE E. SCHUCHARD
BY
ATTORNEY

Nov. 2, 1971   G. E. SHUCHARD III   3,616,537
VISUAL AID DEVICE

Filed Feb. 11, 1970   3 Sheets-Sheet 3

INVENTOR.
GEORGE E. SCHUCHARD
BY
ATTORNEY

United States Patent Office 3,616,537
Patented Nov. 2, 1971

3,616,537
VISUAL AID DEVICE
George E. Schuchard III, 5389 Riverside Drive,
Chino, Calif. 91710
Filed Feb. 11, 1970, Ser. No. 10,503
Int. Cl. A61c 19/00
U.S. Cl. 32—71
12 Claims

ABSTRACT OF THE DISCLOSURE

A device is described which permits the visual demonstration of anatomical movements of the human mandible and the relationship of such movements to the human teeth. The device comprises a pair of plates, one of which bears a view of the mandibular teeth and the other of which bears a view of the maxillary teeth taken along horizontal, sagittal or coronal planes. The location of working and functional cusps are identified on the views and, preferably, at least the upper plate is transparent so that the relative movements of these cusps can be directly observed. The upper plate can also be perforated at the locations of the functional cusps so that a stylus can be inserted to trace the pathways of the cusps on the view of the lower plate. The plates are interconnected by means that permit two dimensional simulation of the anatomical movements and such means can be a plurality of grooves at the right and left sides of one plate with an aperture in the other plate vertically aligned over each groove with a pair of pins, one at each side of the plates, inserted between an aperture and mating groove to link the plates together. Alternative means comprise a dental articulator that permits three dimensional simulation of the anatomical movements.

DESCRIPTION OF THE INVENTION

This invention relates to a visual aid for the demonstration of anatomical movements of the human mandible and interrelationship of such movements to the human teeth, and in particular, to such a visual aid device that is useful in dental instruction of students, patients and dental practitioners.

The human mandible or jaw is connected to the maxilla with a foss-condyle hinge joint that permits highly complex anatomical movements which, because of their complexity, are very difficult to describe or illustrate. While recent improvements have been made in mechanical devices to permit simulation and accurate duplication of the mandibular chewing and border movements, difficulty is often experienced in the education of the dental profession and patients in the significance and interrelationship between these movements and the geometry of the teeth, particularly that of the functional cusp-fossa of the teeth.

Accordingly, it is an object of this invention to provide visual aid means that depict anatomical movements of the human mandible.

It is also an object of this invention to provide such visual aid means to demonstrate the relationship between such movement and the teeth along a horizontal occlusion plane.

It is an additional object of this invention to demonstrate the relationship of such movement and the teeth along a coronal plane of the visual aid means.

It is a futher object of this invention to provide such visual aid means to demonstrate the relationship between such movement and the teeth along a sagittal plane.

Other and related objects will be apparent from the following description of the invention.

The preceding objects are achieved by this invention that, briefly, comprises a visual aid device having a first plate bearing a copy of one of the set of views of the maxillary and mandibular teeth and a second, transparent plate, superimposed on the first plate and bearing a copy of the other of the set of views together with interconnecting means between the two plates which permit relative movements that simulate the anatomical mandibular movements. Separate sets of plates can be provided bearing horizontal, sagittal and coronal views of the teeth which have identifying means for locating the positions of the functional and shearing cusps.

The interconnecting means can comprise a series of slots or grooves in one of the plates with matching apertures in the other plate in vertical alignment with the grooves to permit linking means such as a pin to connect the plates and permit two degrees of relative movement that will demonstrate, in two dimensions, normal and/or abnormal dental occlusions.

In another embodiment for demonstrating movements in three dimensions, a pair of plates bearing views of the teeth are adapted for mounting in a dental articulator to permit direct observation of the three dimensional interrelationship of mandibular movement and occlusion.

The invention will now be described by reference to the figures, of which:

Figure 1:
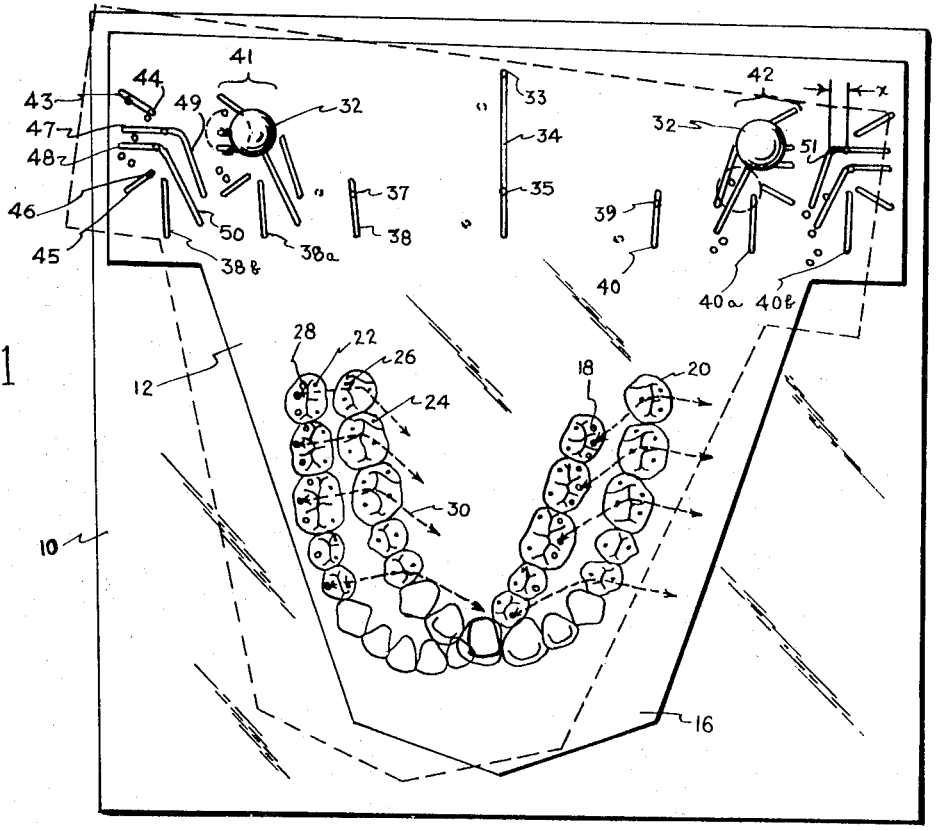
FIG. 1 shows a set of plates having a mandibular horizontal view superimposed on a maxillary horizontal view.

Referring now to FIG. 1, there is shown an embodiment of the invention useful to illustrate the effects of mandibular movement on the maxillary teeth. The device comprises a first plate 10 and a superimposed second plate 12. Plate 12 is preferably transparent and can be formed of any suitable transparent material, e.g., glass, polymethacrylate, etc., while plate 10 can be either opaque or transparent. The overall shape and the dimensions of these plates are not significant, however, it is preferred to provide plate 10 as a square or rectangle and plate 12 in the modified T shape as shown with its upper area 14 bearing a plurality of apertures that cooperate with grooves or slots in plate 10.

The lower, generally V-shaped area 16 of plate 12 bears a copy of a horizontal view 18 of the mandibular teeth centrally located thereon. Plate 10 bears a copy of a horizontal view 20 of the maxillary teeth centrally located and in occlusive opposition to the copy of the mandibular teeth when the plates 10 and 12 are in centric orientation. The copy of these views of the teeth can be incorporated in plate 12 by suitable methods such as etching, printing, embossing, engraving, routing, etc. Preferably, the view is incorporated in a permanent, wear resistant manner. The view on plate 10 can also be permanently affixed thereto or can be printed on a sheet of paper or plastic which can be temporarily affixed thereto or can be printed on a sheet of paper or plastic which can be temporarily secured to the face of plate 10 in centric orientation to the view 18 of the mandibular teeth.

The positions of the shearing cusps on the molars and on the bicuspids are identified by marks 22 on the mandibular view and marks 26 on the maxillary view. The positions of the functional or pestal cusps of the maxillary teeth are similarly identified by marks 24 while the positions of the functional or pestal cusps on the mandibular teeth are located by apertures 28. The apertures will permit insertion of a tracing stylus such as a pencil or pen through plate 12 to record the paths of these functional cusps as plate 12 is moved through the anatomical mandibular movements. Some of these paths, commonly referred to as development grooves, are shown by the dashed, arrowheaded lines 30.

The movements of plate 12 relative to plate 10 are controlled along anatomical pathways by the plurality of apertures in plate 12 and opposing grooves in plate 10. Plate 12 is shown in the right lateral or working position in the broken lines and in a centric position by the solid lines. To avoid confusion in the horizontal views of the teeth, the view 18 of the mandibular teeth is not shown superimposed in centric on the view of the maxillary teeth but is shown only in the right lateral or working position in solid lines. The plates are linked together by a pair of pins 32 which are disposed one at each side of the plates.

The human mandible is hinged to the maxilla with right and left condyles which bear against fossa and which permit protrusion of the mandible, a sliding and opening movement. To duplicate this movement in two dimensions, longitudinal groove 34 is centrally located at the rear of plate 10 and apertures 35 and 33 are located in plate 12 in vertical alignment to groove 34. Pins 32 are placed in these apertures and project into groove 34 to permit the plate to be moved along the protrusive path of the mandible.

The mandible also can rotate about either the right or left condyle. Although this movement is seldom purely rotational about the condyles, it is helpful at times, to depict a purely rotational movement so that such movement can be compared to the more complex mandible movements. This is accomplished by the device with arcuate slots 38 and 40 in plate 10 and apertures in vertical alignment therewith in plate 12 which are identified in FIG. 1 as apertures 37 and 39. Groove 40 is disposed along an arc about the point beneath aperture 37 while groove 38 is disposed along an arc about the point beneath aperture 39.

Considerable variation is often found in the relationship between the lateral spacing between the condyles (intercondylar distance) and the arch width, i.e., the lateral distance between the teeth. To illustrate variation in this principle, three sets of the purely rotational grooves are provided. These are positioned at varied lateral positions on plate 10 to provide a narrow intercondylar distance, grooves 38 and 40; an average intercondylar distance, grooves 38a and 40a and a wide incondylar distance 38b and 40b. Each groove, of course, is provided with an aperture in vertical alignment therewith through plate 12. These are shown but not specifically identified in FIG. 1.

The mandible commonly translates as it pivots about a condyle. This movement is herein referred to as a trusion of the mandible and the terms lateral trusion, medial trusion and retrusion and protrusion are used herein to identify the outward, inward, rearward and forward translations of the rotating condyle. To simulate this movement in two dimensions, plate 10 is provided with at least one symmetrical pair of trusion grooves 41 and 42 which are disposed at an average intercondylar distance. Again, to illustrate the effect of varied intercondylar distances, additional pairs of these groups of grooves at varied spacings can be provided; FIG. 1 illustrating two sets at average and wide intercondylar distances.

Each family or group of grooves has a lateral retrusion groove 43 and a lateral protrusive groove 45 which are provided with apertures 44 and 46 in plate 12 in vertical alignment therewith. Grooves 47 and 48 are provided to simulate entirely lateral trusion of a rotating condyle and these grooves intersect medial trusion grooves 49 and 50 directly beneath apertures in plate 12. The grooves 49 and 50 simulate medial trusion of the condyle as the mandible rotates about the opposite condyle. If desired, only grooves 48–50 need be provided, however, it is preferred to also provide grooves 47–49 as illustrated in each group of trusion grooves.

The movement along groove 50 is also referred to as a progressive side shift of the mandible as it rotates about the opposite condyle. Frequently, the mandible will initially move in an entirely medial direction before it rotates about the opposite working or rotating condyle. As illustrated, in the set of grooves at the right of FIG. 1, grooves 47–49 permit simulation of this movement since groove 47 extends medially past the centric condyle position, aperture 51 by a distance $x$ which will permit an immediate, entirely medial shifting of plate 12 relative to plate 10.

Figure 2:
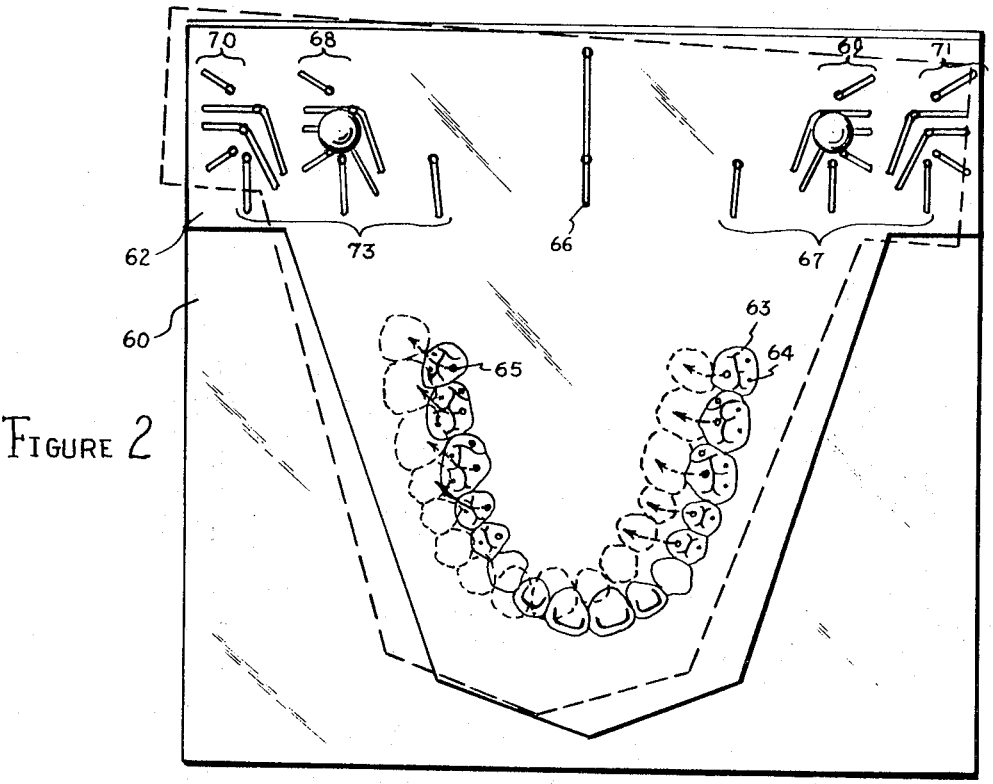
FIG. 2 shows a set of plates having a maxillary horizontal view superimposed on a mandibular horizontal view.

FIG. 2 illustrates a companion set of plates 60 and 62 which are used to illustrate the developmental grooves on the mandibular teeth. The upper plate 62 is transparent and bears a horizontal view 63 of the maxillary teeth with marks 64 to identify shearing cusps of the maxillary teeth, i.e., on the bicuspids and molars, and apertures 65 located at the positions of the functional or pestal cusps. Plate 62 is shown in the centric position in solid lines and in broken lines in the left lateral or working position of the mandible. Plate 60 can be provided with a permanent horizontal view of the mandibular teeth in the manner that plate 10 of FIG. 1 is provided with a permanent view of the maxillary teeth. Alternatively, and as shown in FIG. 2, plate 60 can be blank and a view of the mandibular teeth on a plastic or paper sheet can be temporarily secured in occlusal relationship to the view 63 of the maxillary teeth. For simplicity of illustration, the removable sheet is omitted from FIG. 2 and only the maxillary teeth are shown. Plates 60 and 62 can have the same shape and size as plates 10 and 12. Upper plate 62 is grooved and lower plate 60 has the opposing apertures since the grooves correspond to fossa guides of the maxilla while the apertures correspond to the position of the condyles of the mandible. The slots of FIG. 2 are otherwise similar to their counterparts in plate 10 and comprise the protrusive groove 66; three left and three right purely rotational grooves 73 and 67 at varied intercondylar distances and two pairs, 68 and 69 and 70 and 71 of a grouping of trusion grooves at two varied intercondylar distances.

Figure 3:
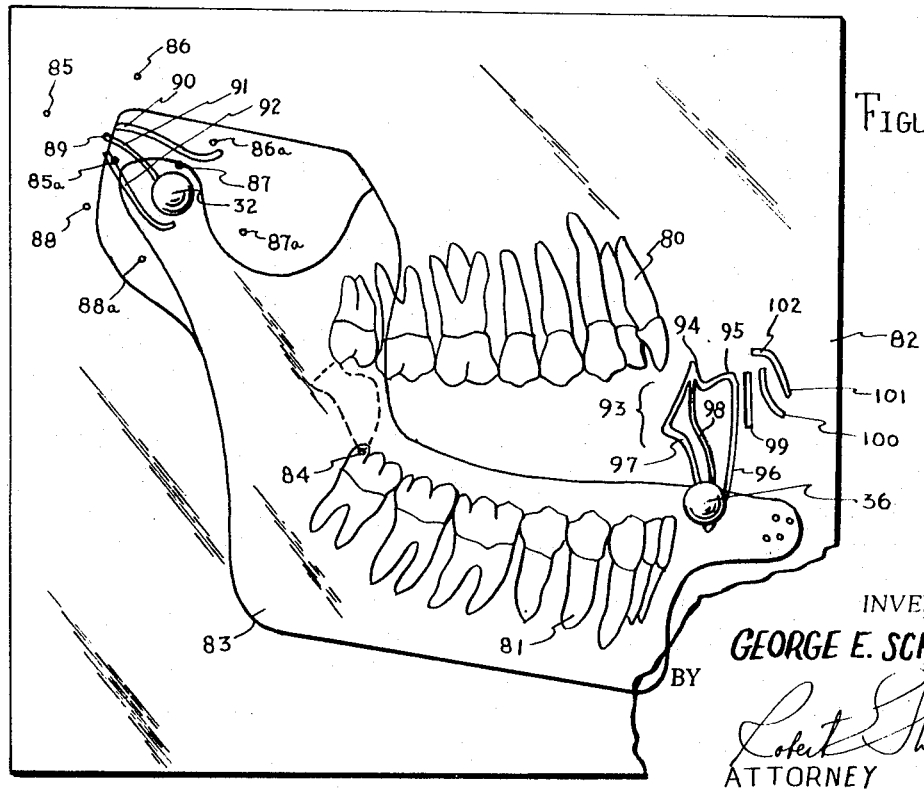
FIG. 3 shows a set of plates illustrating occlusion in a sagittal plane.

Referring now to FIG. 3, the sagittal view of the maxillary teeth 80 and the mandibular teeth 81 are shown on separate plates 82 and 83, respectively. Plate 83 is the upper and transparent plate and bears a permanent view of the mandibular teeth with an aperture 84 positioned at the location of each functional cusp. The view 80 of the maxillary teeth can be, as previously described, permanently or temporarily affixed to plate 82.

At the posterior of the view, plate 82 has four apertures that are useful in illustrating certain types of errors in occlusion and variations in closure path that will unavoidably result from an imprecise location of the hinge axis of the mandible. These apertures are 85 illustrating a posterior error, 86 illustrating a superior error, 87 illustrating an anterior error and 88 illustrating an inferior error. These apertures are spaced equally about the correct hinge axis location 89 and cooperate with opposing apertures 85a, 86a, 87a and 88a in plate 83.

Plate 82 also has grooves 90, 91 and 92 which, with apertures in plate 83 that are in vertical alignment therewith, simulate the pathway followed by the condyles of the mandible moving and bearing in the fossa of the maxillary along a protrusive or lateral protrusive pathway. Groove 90 simulates shallow angle of the eninentia and groove 92 a steep angle of the eninentia. A single aperture is provided in plate 83 at the correct hinge axis center and pin 32 is shown inserted through this aperture and projecting into the protrusive end of groove 91.

The anterior of plate 82 is also slotted. A group of grooves 93 are provided with pathways that duplicate Posselt's envelope of border mandibular movements which are idealized for reconstructive dentistry by elimination of centric slide or skid. This group of grooves comprises groove 94 that permits simulation of the incisal path of the hinge axis; groove 95 that permits simulation of the protrusive mandibular pathway with tooth-to-tooth contact; groove 97 that represents the posterior-most translating border movement; and groove 96 that permits simulation of the anterior-most border movement. Groove 98 permits simulation of the average pathway of habitual closure. These grooves cooperate with a single aperture in plate 83 and pin 36 that projects through this aperture and into the grooves in plate 82.

Slot or groove 99 is provided in plate 82 to indicate a pathway of deep overbite of the mandible. Groove 100 is provided in plate 82 to permit depiction of the mandibular pathway that results from a poorly constructed dental restoration while compound groove 101 is provided with a horizontal leg 102 to permit duplication of a mandibular movement with horizontal over-jet and an inclined leg to permit duplication of normal incisal guidance.

Figure 4:
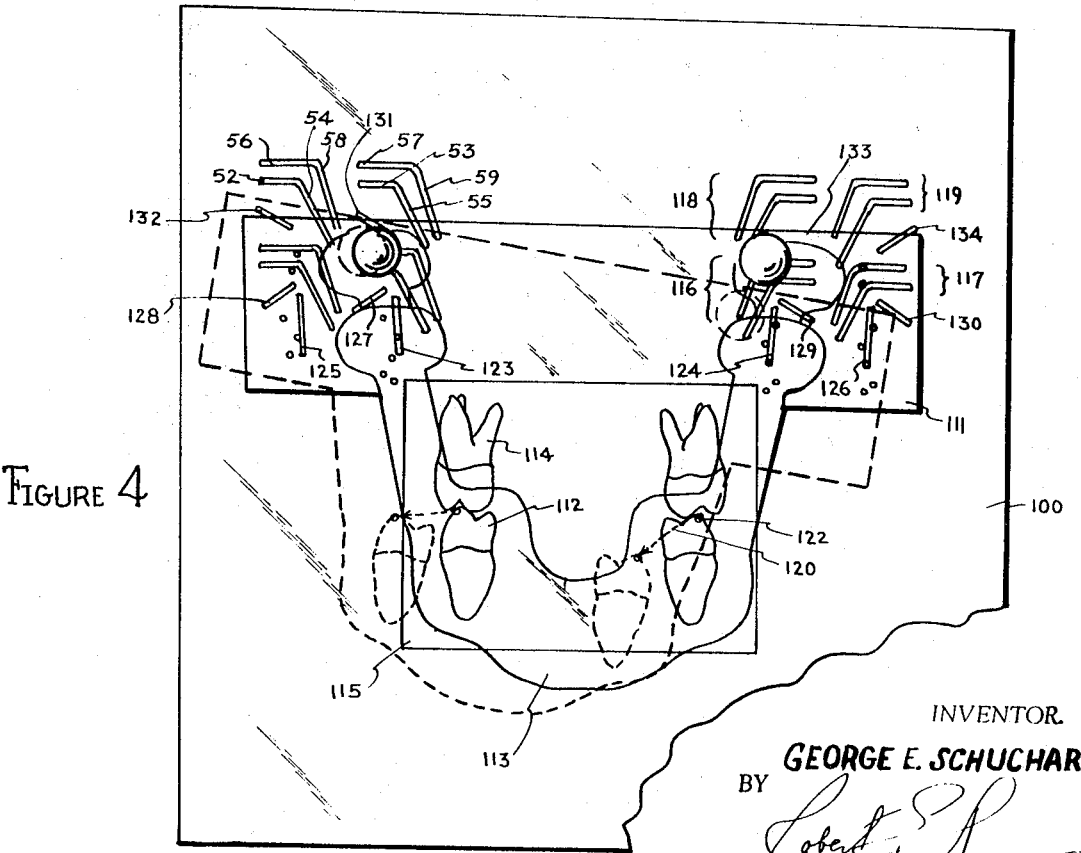
FIG. 4 shows a set of plates illustrating occlusion in a coronal plane.

FIG. 4 is a view of the invention adapted to illustrate the effects of mandibular movement on a coronal sectional view of the teeth. This embodiment uses two plates 110 and 111 with upper plate 111 being transparent and bearing a permanent view 112 of mandibular molars positioned on the mandibular arch 113. Apertures 122 are provided at the positions of the functional cusps of the mandibular molars. As shown, a view of the opposite maxillary molars 114 on sheet 115 is temporarily secured to plate 100 in centric opposition to the mandibular molars 112.

The upper, mandibular plate is shown in centric position in the solid lines and in broken lines in a right lateral or right working position. Plate 111 is provided with a plurality of apertures which cooperate with grooves cut in plate 110 and pins 36 to simulate different mandibular movements.

Fossa grooves are provided in four pairs with each pair having a right and left grouping of grooves. These pairs are identified on the right side of FIG. 4 and comprise right and left groupings of pair 1–6 which are at average intercondylar distance and at an average height of the ramus of the mandible; a pair of right and left groupings 118, also at an average intercondylar distance but at a greater height of the ramus of the mandible; and similar pairs of groupings 117 and 119 at a wide intercondylar distance. The varied intercondylar spacing can be used to illustrate the effect that variations in the mandibular arch width and/or variations in the intercondylar spacing will exhibit on the pathway 120 of the functional cusp 122 of the mandibular molars. Thus, use of the outboard pairs of grooves in plate 100 and their opposed apertures in plate 111 simulates either wide intercondylar spacing or a constricted arch while the inside pairs simulate an average intercondylar spacing or a wider arch.

Each grouping of grooves comprise individual grooves which are identified on the left side of the FIG. 4 as grooves 52 and 53 which permit demonstration of lateral trusion and which extend to intersect inclined grooves 54 and 55 which permit demonstration of medial trusion. To permit demonstration of an immediate and entirely medial movement of the mandible, grooves 56 and 57 are provided which extend a slight distance medially past their opposing aperture in plate 111 before intersecting inclined medial trusion grooves 58 and 59.

Two pairs of grooves, 123 and 124 and 125 and 126 are provided to simulate purely rotational movement. These grooves are arcuate and are disposed along an arc about a center of rotation located at the top end of their opposite groove. Thus, groove 123 is arcuate along a circular arc having its radius at the upper extremity of groove 124. Grooves 127, 128, 129 and 130 are provided for depicting lateral detrusion of the mandible while grooves 131, 132, 133 and 134 are provided for demonstrating lateral surtrusion of the mandible.

Figure 5:
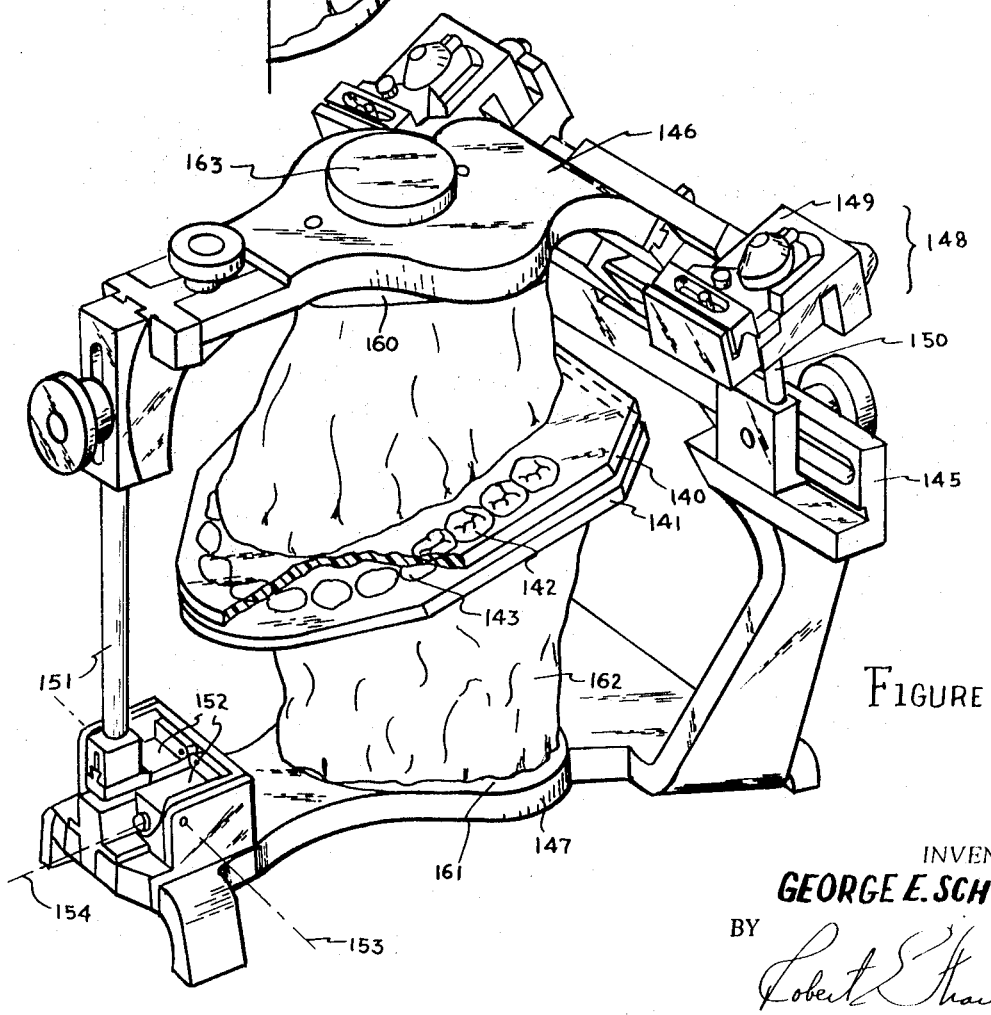
FIG. 5 shows a set of plates with horizontal views incorporated in a dental articulator.

FIG. 5 illustrates a pair of plates 140 and 141 which are mounted in a dental articulator 145 to provide three dimensional movement. Plate 140 is transparent and bears, on its undersurface and along its outer edges, horizontal view 142 of the maxillary teeth while plate 141 bears on its upper surface a horizontal view 143 of the mandibular teeth. Plates 140 and 141 preferably have these views permanently affixed by engraving or routing the outline of the teeth into the surface of the plates and then painting the grooves; or by any of the previously mentioned methods for permanently affixing the views.

The articulator, which is a commercially available model from the Denar Corporation and which is described in "Procedures for Occlusal Treatment" (1969) by the Denar Corporation, has an upper member 146 and a lower member 147 that are hinged together by condyle hinge joints 148 that have adjustable fossa guides 149 that rest on a condyle sphere which is supported at the upper end of shaft 150. The anterior of the articulator is guided through vertical separation by incisal pin 151 which bears against separate incisal guide wings 152 that can be rotated about axes 153 and 154 to permit simulation of mandible movement.

The plates 140 and 141 are mounted to rings 160 and 161, respectively, by plaster 162. These plates are, in turn, temporarily secured to the frame members of the articulator by thumb screws 163.

Figure 6:
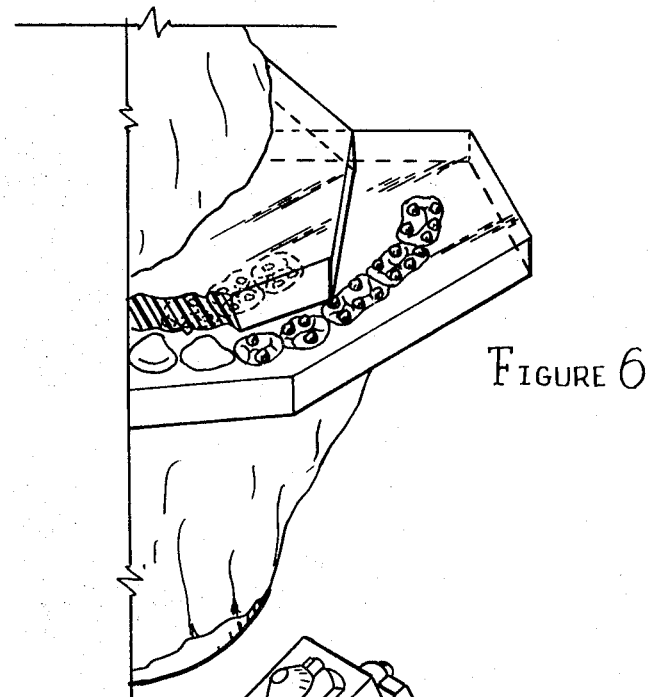
FIG. 6 is a view of a portion of the plates shown in FIG. 5.

The plates are mounted to the rings preferably at an inclined angle to duplicate an angle approximating the occlusal plane and the plates are separated by a slight distance, approximately $\frac{1}{16}$ to $\frac{1}{4}$ inch to permit placement of wax droplets 163 on the plates at the points of the functional and shearing cusps. FIG. 6 illustrates the plates 140 and 141 with wax droplets 163 placed on the pestal cusps and droplets 164 placed on the shearing cusps of the mandibular teeth. Similar wax droplets 165 and 166 are placed on the pestal cusps and shearing cusps, respectively, of the maxilla.

The plates, when positioned on an articulator, are of particular value to permit direct observation of the interrelationship of mandibular movement and the cusp-fossa configuration during demonstration of functional waxing techniques. In these techniques, wax droplets are added to the plates in a step by step procedure until the functional and shearing cusps are built up on the plates and a functionally acceptable occlusion is achieved. A difficulty experienced when working with conventional opaque models that are hidden beneath the plaster is that the student can not directly observe any interferences that may develop during the waxing procedure. The direct observation of the interrelationship of mandibular movement and the cusp-fossa occlusion greatly aids the student in mastering waxing techniques.

The invention has been described with particular reference to the preferred operation and mode of practice which are illustrated in the drawings. It is not intended that this specific illustration be unduly limiting of the invention, but it is intended that the equivalents described herein and the equivalents obvious to those described herein be included in the scope of the invention.

I claim:

1. A dental visual aid device comprising a first generally flat plate bearing a view of one of the mandibular and maxillary human teeth taken taken along one of the sagittal, coronal and horizontal planes, a second generally flat and transparent plate freely movable across said view superimposed on said first plate and bearing a view of the other of the mandibular and maxillary human teeth and taken along the same plane as the view on said first plate, interconnecting means between said first and second plate and operative therewith to control movement of said second plate relative to said first plate along paths simulating the anatomical movements of the human mandible and identifying means locating the functional and shearing cusps of the mandibular and maxillary teeth.

2. The device of claim 1 wherein said interconnecting means are located at the rear of said plates and comprise at least one set of a plurality of grooves at opposite sides of one of said first and second plates and at least one set of a plurality of apertures in the other of said plates located in vertical alignment to said grooves and a pin extending through one of the apertures at each side of the plates and into one of said plurality of grooves.

3. The device of claim 2 wherein said interconnecting means comprise at least two sets of a plurality of said grooves and at least two sets of said plurality of apertures, said sets of grooves and apertures being spaced at varied lateral distances to simulate variations in the intercondylar spacing.

4. The device of claim 2 wherein said plates bear one of the horizontal and coronal views of the teeth.

5. The device of claim 4 wherein said interconnecting means comprise a plurality of grooves formed of at least one arcuate groove laterally spaced at either side of the medial line of said plates and a cooperative aperture with each groove in the other of said plates in vertical alignment with said each groove and wherein said grooves are disposed along arcs having a center of radius at the opposite aperture thereby to permit simulation of purely rotational mandibular movement.

6. The device of claim 4 wherein said plates bear horizontal views and said plurality of grooves comprise a lateral retrusion groove, a lateral protrusion groove and at least one lateral trusion groove intersecting a medial trusion groove.

7. The device of claim 4 wherein said plates bear coronal views of opposed molars and wherein said plurality of grooves comprise a lateral detrusion groove, a lateral surtrusion groove and at least one lateral trusion groove intersecting a medial trusion groove.

8. The device of claim 2 wherein said plates bear sagittal views of the teeth and said plurality of grooves comprise at least one groove at one side of the first plate simulating a condyle pathway, an aperture in the second plate in vertical alignment therewith and, at the opposite side of said first plate grooves along the Posselt envelope of border mandibular movements and an aperture in the second plate in vertical alignment therewith.

9. The device of claim 8 wherein said grooves are also provided at the opposite side of said first plate to demonstrate mandibular movement along at least one of the paths of deep overbite, poorly constructed dental restoration, horizontal over-jet and normal incisal guidance.

10. The device of claim 1 adapted for three dimensional demonstration of mandibular movements in combination with a dental articulator having mounting means to mount dental models in occlusal relationship and adjustable condyle joint means permitting the simulation of mandibular movements, wherein said first and second plates bear horizontal views of said teeth along their periphery and have their central portion secured to said mounting means of said articulator to permit the direct observation of said views.

11. The device of claim 4 wherein said interconnecting means comprise at least one groove longitudinally positioned on one of said first and second plates with aperture means located in the other of said plates in vertical alignment therewith and pin means extending through the aperture means and into said groove whereby the plates can be moved in a simulated protrusive movement of the mandible.

12. The device of claim 1 wherein identifying means of said second plate includes aperture means for insertion of a tracing stylus whereby the paths of said identifying means can be recorded during said relative movement of said plates.

References Cited
UNITED STATES PATENTS

| | | | |
|---|---|---|---|
| 1,840,703 | 1/1932 | Cunningham | 32—71 X |
| 3,376,645 | 4/1968 | Huff | 32—71 |

ROBERT PESHOCK, Primary Examiner